US009262858B2

(12) United States Patent
Ahn et al.

(10) Patent No.: US 9,262,858 B2
(45) Date of Patent: Feb. 16, 2016

(54) APPARATUS AND METHOD FOR DISPLAY (71) Applicant: Samsung Electronics Co., Ltd., Suwon-si (KR)

(72) Inventors: Won-seok Ahn, Yongin-si (KR); Seung-hoon Han, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 175 days.

(21) Appl. No.: 14/016,715

(22) Filed: Sep. 3, 2013

(65) Prior Publication Data
US 2014/0063005 A1   Mar. 6, 2014

(30) Foreign Application Priority Data

Sep. 3, 2012  (KR) .................. 10-2012-0097259

(51) Int. Cl.
G06T 15/10  (2011.01)
G06T 15/00  (2011.01)
G06K 9/00   (2006.01)
H04N 13/02  (2006.01)

(52) U.S. Cl.
CPC .............. *G06T 15/10* (2013.01); *H04N 13/026* (2013.01)

(58) Field of Classification Search
CPC ............................. G06T 15/10; H04N 13/026
See application file for complete search history.

(56) References Cited

U.S. PATENT DOCUMENTS

2002/0048395 A1*   4/2002   Harman et al. ............... 382/154
2010/0194856 A1*   8/2010   Varekamp ..................... 348/42

FOREIGN PATENT DOCUMENTS

WO         02/13141         2/2002

OTHER PUBLICATIONS

Extended European Search Report issued Feb. 27, 2014 in European Patent Application No. 13181885.8.
Chenglei Wu et al., "A Novel Method for Semi-automatic 2D to 3D Video Conversion", 3DTV-CON'08, May 2008, pp. 65-68.
Hung-Ming Wang et al., "Depth Maps Interpolation From Existing Pairs of Keyframes and Depth Maps for 3D Video Generation", IEEE International Symposium on Circuits and Systems, 2010, pp. 3248-3251.

* cited by examiner

*Primary Examiner* — Sing-Wai Wu
(74) *Attorney, Agent, or Firm* — Staas & Halsey LLP (57) ABSTRACT

Display apparatus and method are provided. The display apparatus may include a receiver for receiving an image; a grouper for analyzing the received image and grouping a plurality of frames of the received image based on the analysis; a depth allocator for determining at least two key frames from a plurality of frames grouped into at least one group, and allocating a depth per object in the determined key frames; and an image generator for generating a 3D image corresponding to other frames excluding the key frames based on a depth value allocated to the key frames. Hence, the display apparatus can allocate the depth value of a higher quality to the object in the frames of the received image.

13 Claims, 5 Drawing Sheets

APPARATUS AND METHOD FOR DISPLAY

CROSS-REFERENCE TO RELATED APPLICATIONS

This application claims the priority benefit under 35 U.S.C. §119 (a) from Korean Patent Application No. 10-2012-0097259 filed on Sep. 3, 2012 in the Korean Intellectual Property Office, the entire disclosure of which is incorporated herein by reference.

BACKGROUND

1. Field

Embodiments relate generally to display apparatus and method. More particularly, embodiments relate to display apparatus and method for providing a 3D image.

2. Description of the Related Art

Conventional display devices convert a received image to a 3D image using one of the following methods.

In general, upon receiving the image, the display device determines a depth value by analyzing the received image and creates 3D images for left-eye and right-eye images based on the determined depth value. Alternatively, the display device determines the depth value per object by analyzing frames of the received image and estimating an edge of the object in each frame, and creates 3D images for left-eye and right-eye images based on the determined depth value.

However, such conventional 3D image conversion methods cannot obtain the uniform depth value, or cannot precisely detect the object in each frame. In addition, when adjusting the depth value estimated per object, the conventional 3D image conversion methods take much time to determine whether to adjust the corresponding depth value and to adjust the depth value according to the determination.

SUMMARY

In an aspect of one or more embodiments, there is provided a method and apparatus to solve the above-mentioned problems and disadvantages of conventional apparatuses and methods and/or other problems and disadvantages by providing one or more embodiments of display apparatuses and methods for efficiently converting a 2D image to a 3D image.

According to an aspect of one or more embodiments, there is provided a display apparatus which includes a receiver for receiving an image; a grouper to analyze the received image and to group a plurality of frames of the received image based on the analysis; a depth allocator to determine at least two key frames from a plurality of frames grouped into at least one group, and to allocate a depth value per object in the determined key frames; and an image generator to generate a 3D image corresponding to other frames excluding the key frames based on the depth value allocated to the key frames.

The display apparatus may further include an image analyzer to detect motion information of an object in the frames grouped into the at least one group. The image generator generates the 3D image corresponding to the other frames excluding the key frames based on the detected motion information and the depth value allocated to the key frames.

The image generator may include a position determiner to determine an object position in the other frames based on the detected motion information; a frame generator to estimate a depth value of the positioned object based on the depth value allocated to the key frames, and to generate the 3D image frame corresponding to the other frames by allocating the estimated depth value to the positioned object; and a 3D image generator to generate left-eye and right-eye images for the generated 3D image frame.

When the object in the key frames is the same as the object in the other frames excluding the key frames, the image generator may generate the 3D image by allocating the same depth value as the object of the key frames to the object in the other frames.

The depth allocator may determine the number of the key frames according to an algorithm type of the image generator for generating the 3D image corresponding to the other frames excluding the key frames.

The display apparatus may further include a scaler for scaling the at least two determined key frames to a preset size.

The scaler may determine the size according to the algorithm type of the image generator for generating the 3D image corresponding to the other frames excluding the key frames.

The display apparatus may further include a controller to adjust the estimated depth value based on brightness information of the object of the other frames.

According to an aspect of one or more embodiments, there is provided a display method for converting an input 2D image to a 3D image in a display apparatus, includes receiving an image; analyzing the received image and grouping a plurality of frames of the received image based on the analysis; determining at least two key frames from the plurality of frames grouped into at least one group, and allocating a depth value per object in the determined key frames; and generating a 3D image corresponding to other frames excluding the key frames based on the depth value allocated to the key frames.

The display method may further include detecting motion information of an object in the frames grouped into the at least one group. The generating of the 3D image generates the 3D image corresponding to the other frames excluding the key frames based on the detected motion information and the depth value allocated to the key frames.

The generating of the 3D image may include determining an object position in the other frames based on the detected motion information; estimating a depth value of the positioned object based on the depth value allocated to the key frames, and generating the 3D image frame corresponding to the other frames by allocating the estimated depth value to the positioned object; and generating left-eye and right-eye images for the generated 3D image frame.

When the object in the key frames is the same as the object in the other frames excluding the key frames, the generating of the 3D image may generate the 3D image by allocating the same depth value as the object of the key frames to the object in the other frames.

The allocating of the depth may determine the number of the key frames according to an algorithm type for generating the 3D image corresponding to the other frames excluding the key frames.

The display method may further include scaling the at least two determined key frames to a preset size.

The scaling may determine the size according to the algorithm type for generating the 3D image corresponding to the other frames excluding the key frames.

The generating of the 3D image may adjust the estimated depth value based on brightness information of the object of the other frames.

According to an aspect of one or more embodiments, there is provided at least one non-transitory computer readable medium storing computer readable instructions to implement methods of one or more embodiments.

According to an aspect of one or more embodiments, there is provided a display apparatus which can minimize a time taken to allocate the depth value to the object in frames of the received image, allocate the depth value of a higher quality, and minimize the adjustment of the estimated depth value.

BRIEF DESCRIPTION OF THE DRAWINGS

These and/or other aspects of embodiments will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout.

Figure 1:
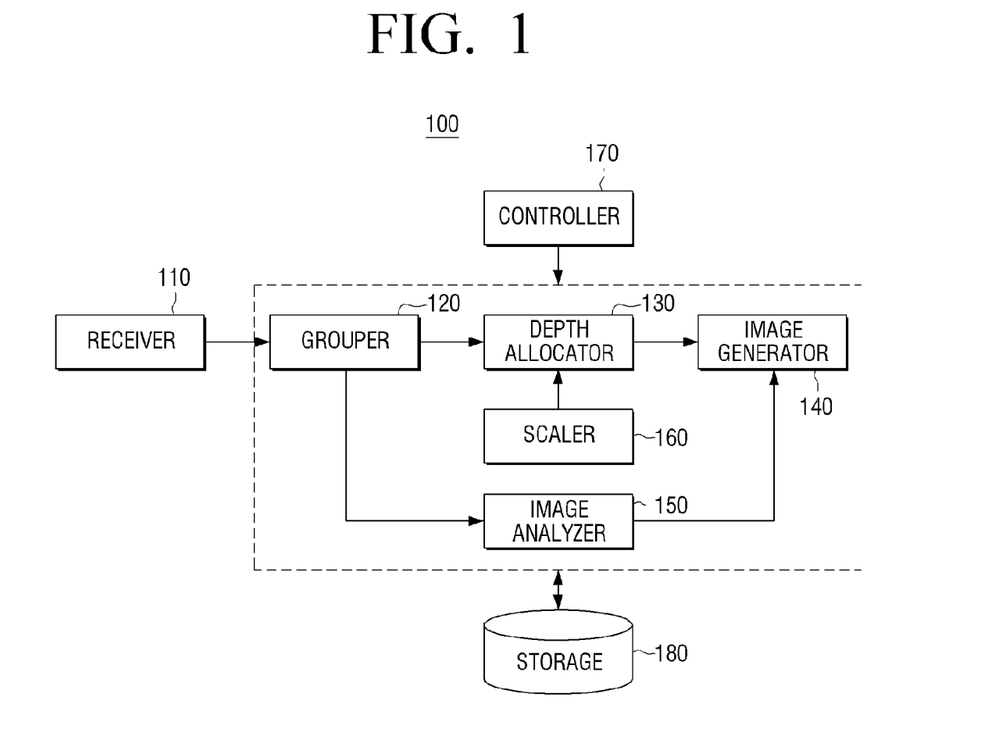
FIG. 1 is a block diagram of a display apparatus according to an embodiment.

FIG. 1 is a block diagram of a display apparatus according to an embodiment.

As shown in FIG. 1, the display apparatus 100 includes a receiver 110, a grouper 120, a depth allocator 130, and an image generator 140. The receiver 110 for receiving an image can receive an image from a broadcasting station over a broadcasting network, or receive an image from a web server over Internet. When receiving the image from the broadcasting station over the broadcasting network, the receiver 110 can include a tuner (not shown), a demodulator (not shown), an equalizer (not shown), and so on. When receiving the image from the web server over the Internet, the receiver 110 can include a network interface (not shown). In addition, the receiver 110 can receive an image from various recording medium players which are embedded in the display apparatus 100 or connected to the display apparatus 100. Herein, the recording medium player represents a device for playing images stored to various recording media such as CD, DVD, hard disc, Blu-ray disc, memory card, and USB memory.

Embodiments are not limited to those devices, and the display apparatus 100 can receive an image from an external device through a communication part (not shown). The communication part (not shown) can include various communication modules such as wireless local communication module (not shown) and wireless communication module (not shown). Herein, the wireless local communication module (not shown) wirelessly communicates with an external device in a short range, and can conform to, for example, Bluetooth and Zigbee. The wireless communication module (not shown) communicates via an external network according to a wireless communication protocol such as WiFi and IEEE. Besides, the wireless communication module can further include a mobile communication module for accessing and communicating over a mobile communication network according to various mobile communication standards such as $3^{rd}$ Generation (3G), $3^{rd}$ Generation Partnership Project (3GPP), and Long Term Evolution (LTE).

As such, when the image is received through one of the receiver 110 and the communication part (not shown), the grouper 120 analyzes the received image and groups a plurality of frames of the received image based on the analysis. When the frames of the received image are grouped, the depth allocator 130 determines at least two key frames from the frames of at least one group and allocates a depth per object in the determined key frames.

Figure 2:
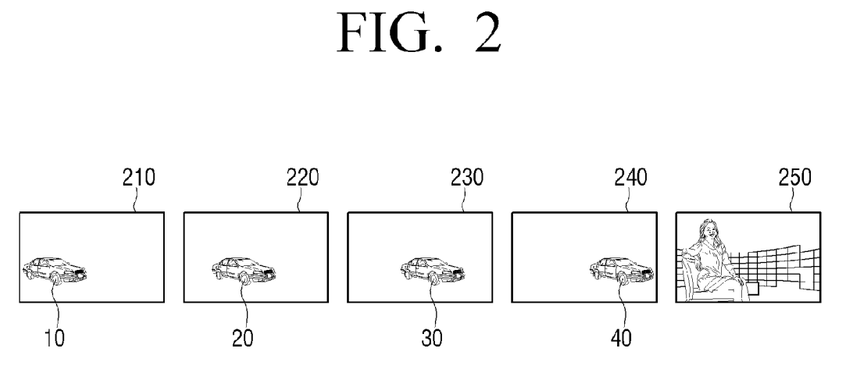
FIG. 2 is a diagram of a plurality of grouped frames of a received image in the display apparatus according to an embodiment.

FIG. 2 is a diagram of a plurality of grouped frames of the received image in the display apparatus according to an embodiment.

As shown in FIG. 2, when the image is received through the receiver 110 or the communication part (not shown), the grouper 120 analyzes at least one image feature of scene change, motion characteristic, and screen configuration, based on frames 210, 220, 230, 240, and 250 of the received image. According to implementations, the grouper 120 can analyze the image feature of the scene change of the received image and group the frames 210 through 240 including the same scene among the frames 210 through 250, into one group. As such, when the image feature of the frames 210 through 250 of the image is analyzed and the frames 210 through 240 are grouped into one group, the grouper 120 can temporarily store the grouped frames to the storage 180.

When the grouper 120 completely groups the frames of the received image, the depth allocator 130 determines at least two key frames from the frames of at least one group and allocates the depth per object in the determined key frames. More specifically, as mentioned in FIG. 2, when the grouper 120 analyzes the image feature of the frames 210 through 250 of the image and groups the frames 210 through 240 into one group, the depth allocator 130 can determine, but not limited to, at least two key frames from the grouped frames 210 through 240. The depth allocator 130 can determine one of the grouped frames 210 through 240 as the key frame. Herein, at least two key frames are determined from the plurality of the grouped frames.

For example, when the frames 210 and 240 of the grouped frames 210 through 240 are determined as the key frames, the depth allocator 130 can allocate the depth to, but not limited to, objects 10 and 40 of the key frames 210 and 240. The key allocator 130 can allocate the depth to not only the objects 10 and 40 in the key frames 210 and 240 but also other regions excluding the corresponding objects 10 and 40.

When the depth is allocated to each object in the at least two key frames of the frames of the at least one group, the image generator 140 generates a 3D image corresponding to the other frames excluding the key frames based on the depth value allocated to the key frames, which shall be explained in detail.

The display apparatus 100 can further include an image analyzer 150. The image analyzer 150 detects motion information of the objects in the frames of at least one group organized by the grouper 120. In detail, as stated in FIG. 2, for example, when the frames 210 through 240 of the frames 210 through 250 of the received image are grouped into one group, the image analyzer 150 detects motion information of objects 10, 20, 30, and 40 in the grouped frames 210 through 240.

According to an embodiment, the image analyzer 150 can detect the motion information of the objects 10 through 40 in the frames 210 through 240 using a motion detection algorithm. Alternatively, the image analyzer 150 can obtain position and angle (or direction) information of the objects 10 through 40 by tracking feature points of the objects 10 through 40 in the frames 210 through 240, and detect the motion information of the objects 10 through 40 based on the obtained information.

When the image analyzer 150 detects the motion information of the objects in the frames of one group, the image generator 140 can generate a 3D image corresponding to the other frames excluding the determined key frames, based on the detected motion information and the depth value allocated by the depth allocator 130 to the objects of the key frames among the frames of the corresponding group. The image generator 140 may temporarily store the detected motion information to the storage 180. When the 3D image corresponding to the other frames excluding the determined key frames is generated based on the depth value allocated by the depth allocator 130 and the motion information detected by the image analyzer 150, the image generator 140 can be constructed as shown in FIG. 3.

Figure 3:
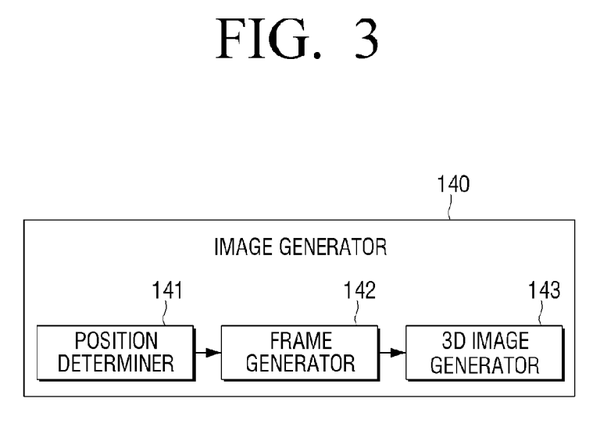
FIG. 3 is a detailed block diagram of an image generator according to an embodiment.

FIG. 3 is a detailed block diagram of the image generator according to an embodiment.

As shown in FIG. 3, the image generator 140 includes a position determiner 141, a frame generator 142, and a 3D image generator 143.

The position determiner 141 determines a position of the object in the other frames based on the motion information detected by the image analyzer 150. The frame generator 142 estimates the depth value of the object positioned by the position determiner 141, based on the depth value allocated by the depth allocator 130 to the at least two key frames determined. Next, the frame generator 142 generates the 3D image corresponding to the other frames by allocating the estimated depth value to the positioned object. The 3D image generator 143 generates left-eye and right-eye images for the 3D image frame generated by the frame generator 142.

For example, as stated in FIG. 2, the grouper 120 can group the frames 210 through 240 of the frames 210 through 250 of the image into the one group. In this case, the image analyzer 150 can detect the motion information of the objects 10 through 40 in the grouped frames 210 through 240 and store the motion information to the storage 180. Hence, based on the motion information stored to the storage 180, the position determiner 141 can determine the positions of the objects 20 and 30 in the other frames excluding the determined key frames 210 and 240, that is, in the frames 220 and 230 among the frames 210 through 240 grouped by the grouper 120.

When the positions of the objects 20 and 30 are determined in the other frames excluding the determined key frames 210 and 240, that is, in the frames 220 and 230 among the grouped frames 210 through 240, the frame generator 142 can estimate the depth value of the objects 20 and 30 in the frames 220 and 230 based on the depth value allocated by the depth allocator 130 to the key frames 210 and 240. Next, the frame generator 142 generates first and second 3D image frames corresponding to the other frames excluding the determined key frames 210 and 240, that is, the frames 220 and 230.

Next, the frame generator 142 generates a first object corresponding to the object 20 in the first 3D image frame based on the position information of the object 20 of the frame 220 determined by the position determiner 141, and allocates the depth value estimated for the object 20, to the first object. Likewise, the frame generator 142 generates a second object corresponding to the object 30 in the second 3D image frame based on the position information of the object 30 of the frame 230 determined by the position determiner 141, and allocates the depth value estimated for the object 30, to the second object. When the 3D image frames are generated, the 3D image generator 143 generates left-eye and right-eye images for the 3D image frame. In so doing, the 3D image generator 143 can generate the left-eye and right-eye images together for the key frames 210 and 240.

When the object in the key frames is the same as the object in the other frames excluding the key frames, the image generator 140 can generate the 3D image by allocating the depth value of the object of the other frames as the depth value allocated to the object of the key frames.

Figure 4:
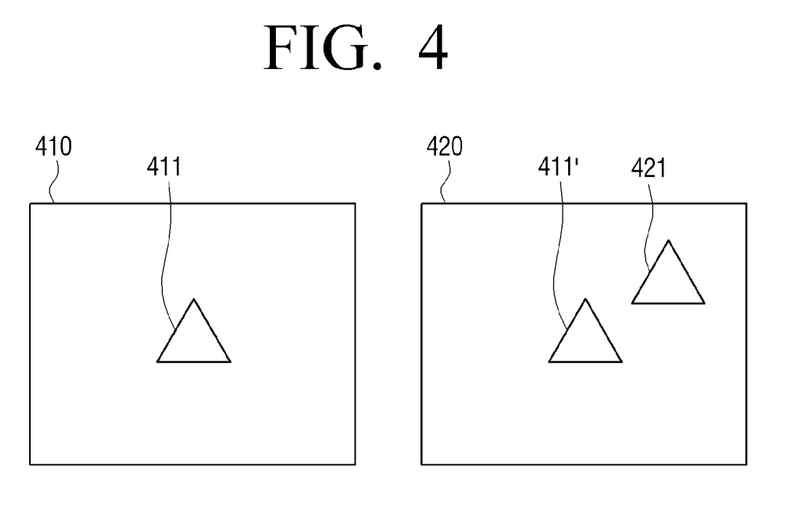
FIG. 4 is a diagram of 3D image generation of the image generator when objects in key frames and other frames are the same according to an embodiment.

FIG. 4 is a diagram of the 3D image generation of the image generator when the objects in the key frames and the other frames are the same according to an embodiment.

As shown in FIG. 4, the same objects 411' and 421 as an object 411 of a key frame 410 can be included in other frame 420. The object 411' in the other frame 420 can be formed at the same position as the object 411 of the key frame 410. In this case, the image generator 140 can allocate the depth value of the object 411 of the key frame 410 to the object 411' of the other frame 420, without detecting separate motion information of the object 411' of the other frame 420.

The depth allocator 130 can differently determine the number of the key frames according to an algorithm type which generates the 3D image corresponding to the other frames excluding the determined key frames among the plurality of the grouped frames in the image generator 140. That is, the image generator 140 can allocate the depth value to the object in the other frames excluding the determined key frames using the algorithm such as bilateral filter, trilateral filter, and de-noising filter. Herein, the bilateral filter, the trilateral filter, and the de-noising filter are well known in the art and shall be omitted here.

As such, according to the algorithm type for allocating the depth value to the object in the other frames excluding the determined key frames, the depth allocator 130 can determine the number of the key frames among the plurality of the frames of the corresponding group. For example, when one group includes 10 frames and the algorithm for allocating the depth value to the other frames exhibits good performance in the image generator 140, the depth allocator 130 can determine two of the 10 frames as the key frames. By contrast, when the algorithm for allocating the depth value to the other frames exhibits poor performance in the image generator 140, the depth allocator 130 can determine five of the 10 frames as the key frames. That is, the depth allocator 130 can decrease or increase the number of the key frames among the plurality of the frames grouped into one group, depending on the performance of the algorithm for allocating the depth value to the other frames in the image generator 140.

The display apparatus 100 can further include a scaler 160 for scaling the frames of the received image into a preset size. In detail, the scaler 160 scales the key frames determined from the plurality of the frames grouped by the grouper 120 into the one group, to the preset size. Embodiments are not limited to this operation, and the scaler 160 can scale the frames of the corresponding image to the preset size before the grouper 120 groups the frames of the received image. Herein, only how the scaler 160 scales the determined key frames to the preset size is explained.

The scaler 160 differently determines the size according to the algorithm type for generating the 3D image corresponding to the other frames excluding the key frames in the image generator 140. The image generator 140 can allocate the depth value to the object in the other frames excluding the determined key frames using the aforementioned algorithm such as bilateral filter, trilateral filter, and de-noising filter. As such, the scaler 160 can differently adjust the size of the key frames determined from the frames of the corresponding group according to the algorithm type for allocating the depth value to the object in the other frames excluding the determined key frames. That is, as the performance of the algorithm for allocating the depth value to the other frames gets better in the image generator 140, the scaler 160 can reduce the size of the determined key frames.

The display apparatus 100 can further include a controller 170 for controlling the operations of the components. The controller 170 for controlling the operations of the components can adjust the depth value estimated by the frame generator 142 based on brightness information of the object in the other frames excluding the determined key frames among the plurality of the frames grouped into one group. In detail, the controller 170 can obtain the brightness information of the object in the other frames excluding the determined key frames among the plurality of the grouped frames, and store the brightness information to the storage 180. For example, when the frames 210 and 220 of the frames 210 through 240 grouped into one group are determined as the key frames as mentioned in FIG. 2, the controller 170 can obtain the brightness information of the objects 20 and 30 in the other frames 220 and 230 and store the brightness information to the storage 180.

Next, when the depth value is estimated to the first and second objects in the first and second 3D image frames corresponding to the other frames 220 and 230 by the frame generator 142, the controller 170 can adjust the depth value of the first and second objects corresponding to the objects 20 and 30 based on the brightness information of the objects 20 and 30 stored to the storage 180. Hence, the 3D image generator 143 can generate the left-eye and right-eye images of the 3D image frame including the objects with the adjusted depth value.

So far, the structure of the display apparatus 100 for converting the input image to the 3D image has been explained in detail. Hereafter, a method for converting the input image, that is, the 2D image to the 3D image in the display apparatus 100 is elucidated.

Figure 5:
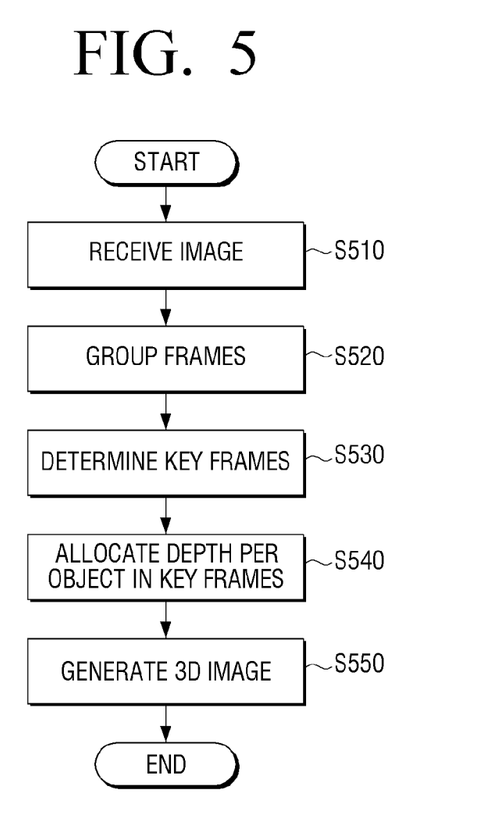
FIG. 5 is a flowchart of a display method for converting a 2D image to a 3D image in the display apparatus according to an embodiment.

FIG. 5 is a flowchart of a display method for converting the 2D image to the 3D image in the display apparatus according to an embodiment.

As shown in FIG. 5, the display apparatus receives the image from the external device (S510). In detail, the display apparatus can receive the image from the broadcasting station over the broadcasting network, receive the image from the web server over the Internet, or receive the image using the wireless communication. In addition, the display apparatus can receive the image from various recording medium players which are embedded in the display apparatus or connected to the display apparatus. Herein, the recording medium player represents the device for playing images stored to various recording media such as CD, DVD, hard disc, Blu-ray disc, memory card, and USB memory.

Herein, the received image may be a 2D image. Upon receiving the image, the display apparatus analyzes the received image and groups the plurality of the frames of the received image based on the analysis (S520). When the frames of the received image are grouped, the display apparatus determines at least two key frames from the frames of at least one group and allocates the depth per object in the determined key frames (S530 and S540).

More specifically, when receiving the image, the display apparatus analyzes at least one image feature of the scene change, the motion characteristic, and the screen configuration, based on the frames of the received image. As stated in FIG. 2, when the frames 210 through 240 including the same scene among the frames 210 through 250 are grouped into one group, the display apparatus can determine the frames 210 and 240 of the frames 210 through 240 grouped into one group, as the key frames. Upon determining the frames 210 and 240 as the key frames, the display apparatus can allocate the depth to the objects 10 and 40 in the frames 210 and 240 determined as the key frames.

When allocating the depth per object in the at least two key frames among the frames of the at least one group, the display apparatus generates the 3D image corresponding to the other frames excluding the determined key frames based on the depth value allocated to the key frames (S550).

According to the implementations, the display apparatus can detect the motion information of the objects in the grouped frames of the at least one group, and generate the 3D image corresponding to the other frames excluding the determined key frames based on the detected motion information and the depth value allocated to the key frames. In detail, the display apparatus can detect the motion information of the objects in the grouped frames of the at least one group using the motion detection algorithm. Alternatively, the display apparatus can obtain the position and angle (or direction) information of the objects by tracking the feature points of the objects in the frames of one group, and detect the motion information of the objects using the obtained information.

As such, when detecting the motion information per object in the frames of one group, the display apparatus can generate the 3D image corresponding to the other frames excluding the determined key frames based on the determined motion information and the depth value allocated to the objects in the determined key frames.

Figure 6:
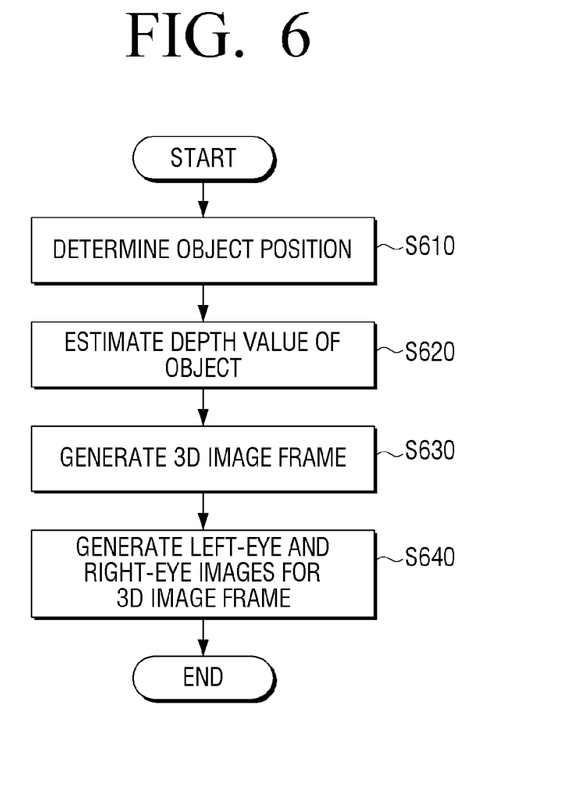
FIG. 6 is a flowchart of a method for generating the 3D image in the display apparatus according to an embodiment.

Now, a method of the display apparatus for creating the 3D image corresponding to the other frames excluding the determined key frames based on the determined motion information and the depth value allocated to the key frames is described in detail by referring to FIG. 6.

FIG. 6 is a flowchart of a method for generating the 3D image in the display apparatus according to an embodiment.

As shown in FIG. 6, the display apparatus determines the position of the object in the other frames based on the detected motion information per object in the frames grouped into one group (S610). The display apparatus estimates the depth value of the positioned object in the other frames, based on the depth value allocated to the key frames (S620). Next, the display apparatus generates the 3D image frame corresponding to the other frames by allocating the estimated depth value to the positioned object (S630). Next, the display apparatus generates the left-eye and right-eye images for the generated 3D image frame corresponding to the other frames (S640).

For example, as described in FIG. 2, when grouping the frames 210 through 240 of the frames 210 through 250 of the image into the one group, the display apparatus detects and stores the motion information of the objects 10 through 40 in the grouped frames 210 through 240 of one group. Hence, based on the prestored motion information, the display apparatus can determine the positions of the objects 20 and 30 in the other frames excluding the determined key frames 210 and 240, that is, in the frames 220 and 230 among the frames 210 through 240 grouped into one group.

When the positions of the objects 20 and 30 are determined in the frames 220 and 230, the display apparatus can estimate the depth value of the objects 20 and 30 in the frames 220 and 230 based on the depth value allocated to the determined key frames 210 and 240. Next, the display apparatus generates the first and second 3D image frames corresponding to the other frames excluding the determined key frames 210 and 240, that is, the frames 220 and 230.

Next, the display apparatus generates the first object corresponding to the relevant object 20 in the first 3D image frame based on the position information of the object 20 of the frame 220 determined in S610, and allocates the depth value estimated for the object 20, to the first object. Likewise, the display apparatus generates the second object corresponding to the relevant object 30 in the second 3D image frame based on the position information of the object 30 of the frame 230 determined in S610, and allocates the depth value estimated for the object 30, to the second object. Upon generating the 3D image frame, the display apparatus generates the left-eye and right-eye images for the 3D image frame. In so doing, the display apparatus can generate the left-eye and right-eye images together for the determined key frames 210 and 240.

When the object in the key frames is the same as the object in the other frames excluding the key frames, the display apparatus can generate the 3D image by determining and allocating the depth value of the object of the other frames as the depth value allocated to the object of the key frames. As described in FIG. 4, for example, the same objects 411' and 421 as the object 411 of the key frame 410 can exist in the other frame 420. The object 411' in the other frame 420 can be formed at the same position as the object 411 of the key frame 410. In this case, the display apparatus can allocate the depth value of the object 411 of the key frame 410 to the object 411' of the other frame 420, without detecting separate motion information of the object 411' of the other frame 420.

The display apparatus can differently determine the number of the key frames according to the algorithm type which generates the 3D image corresponding to the other frames excluding the determined key frames among the plurality of the frames grouped into one group in S540. In more detail, the display apparatus can allocate the depth value to the object in the other frames excluding the determined key frames using the algorithm such as bilateral filter, trilateral filter, and de-noising filter. Herein, the bilateral filter, the trilateral filter, and the de-noising filter are well known in the art and shall be omitted here.

As such, according to the algorithm type for allocating the depth value to the object in the other frames excluding the determined key frames, the display apparatus can determine the number of the key frames among the plurality of the frames of the corresponding group. For example, when one group includes 10 frames and the algorithm for allocating the depth value to the other frames exhibits good performance, the display apparatus can determine two of the 10 frames as the key frames. By contrast, when the algorithm for allocating the depth value to the other frames exhibits poor performance, the display apparatus can determine five of the 10 frames as the key frames. That is, the display apparatus can decrease or increase the number of the key frames among the plurality of the frames grouped into one group, depending on the performance of the algorithm for allocating the depth value to the other frames.

The display apparatus can scale the frames of the received image into the preset size. In detail, the display apparatus scales the key frames determined from the plurality of the frames grouped into the one group, to the preset size. Embodiments are not limited to this operation, and the display apparatus can scale the frames of the corresponding image to the preset size before the frames of the received image are grouped. Herein, only how the display apparatus scales the determined key frames to the preset size is explained.

The display apparatus can differently determine the size according to the algorithm type for generating the 3D image corresponding to the other frames excluding the key frame. As explained earlier, the display apparatus can allocate the depth value to the object in the other frames excluding the determined key frames using the algorithm such as bilateral filter, trilateral filter, and de-noising filter. As such, the display apparatus can differently adjust the size of the key frames determined from the frames of the corresponding group according to the algorithm type for allocating the depth value to the object in the other frames excluding the determined key frames. That is, as the performance of the algorithm for allocating the depth value to the object in the frames gets better, the display apparatus can reduce the size of the determined key frames.

The display apparatus can adjust the depth value to allocate to the object in the other frames, based on the brightness information of the object in the other frames excluding the determined key frames among the plurality of the frames grouped into one group. In detail, the display apparatus can obtain and store the brightness information of the object in the other frames excluding the determined key frames among the plurality of the grouped frames. For example, when the frames 210 and 220 of the frames 210 through 240 grouped into one group are determined as the key frames as mentioned in FIG. 2, the display apparatus can obtain and store the brightness information of the objects 20 and 30 in the other frames 220 and 230.

Next, when the depth value is allocated to the first and second objects generated in the first and second 3D image frames corresponding to the other frames 220 and 230, the display apparatus can adjust the depth value of the first and second objects corresponding to the objects 20 and 30 based on the prestored brightness information of the objects 20 and 30. Hence, the display apparatus can create the left-eye and right-eye images of the 3D image frame including the objects with the adjusted depth value.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

Although a few embodiments of have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
a receiver to receive an image;
a grouper to analyze the received image and to group a plurality of frames of the received image based on the analysis into at least one group;
a depth allocator to determine at least two key frames from the plurality of frames of the at least one group, and to allocate a depth value per object in the determined key frames;
an image generator to generate a 3D image corresponding to other frames excluding the key frames based on the depth value allocated to the key frames using at least one processor; and
a scaler to scale the at least two determined key frames to a preset size,
wherein the scaler determines the size according to the algorithm type of the image generator for generating the 3D image corresponding to the other frames excluding the key frames.

2. The display apparatus of claim 1, wherein the image generator comprises:
a position determiner to determine an object position in the other frames based on the detected motion information;
a frame generator to estimate a depth value of the positioned object based on the depth value allocated to the key frames, and to generate the 3D image frame corresponding to the other frames by allocating the estimated depth value to the positioned object; and
a 3D image generator to generate left-eye and right-eye images for the generated 3D image frame.

3. The display apparatus of claim 1, wherein, when the object in the key frames is the same as the object in the other frames excluding the key frames, the image generator generates the 3D image by allocating the same depth value as the object of the key frames to the object in the other frames.

4. The display apparatus of claim 1, wherein the depth allocator determines the number of the key frames according to an algorithm type of the image generator for generating the 3D image corresponding to the other frames excluding the key frames.

5. The display apparatus of claim 1, further comprising:
a controller to adjust the estimated depth value based on brightness information of the object of the other frames.

6. The display apparatus of claim 1, further comprising an image analyzer to detect motion information of an object in the frames grouped into the at least one group,
wherein the image generator generates the 3D image corresponding to the other frames excluding the key frames based on the detected motion information and the depth value allocated to the key frames.

7. A display method for converting an input 2D image to a 3D image in a display apparatus, comprising:
receiving an image;
analyzing the received image and grouping a plurality of frames of the received image based on the analysis;
determining at least two key frames from a plurality of frames grouped into at least one group, and allocating a depth value per object in the determined key frames;
generating a 3D image corresponding to other frames excluding the key frames based on the depth value allocated to the key frames using at least one processor; and
scaling the at least two determined key frames to a preset size,
wherein the scaling determines the size according to the algorithm type for generating the 3D image corresponding to the other frames excluding the key frames.

8. The display method of claim 7, wherein the generating of the 3D image comprises:
determining an object position in the other frames based on the detected motion information;
estimating a depth value of the positioned object based on the depth value allocated to the key frames;
generating the 3D image frame corresponding to the other frames by allocating the estimated depth value to the positioned object; and
generating left-eye and right-eye images for the generated 3D image frame.

9. The display method of claim 7, wherein, when the object in the key frames is the same as the object in the other frames excluding the key frames, the generating of the 3D image generates the 3D image by allocating the same depth value as the object of the key frames to the object in the other frames.

10. The display method of claim 7, wherein the allocating of the depth determines the number of the key frames according to an algorithm type for generating the 3D image corresponding to the other frames excluding the key frames.

11. The display method of claim 7, wherein the generating of the 3D image adjusts the estimated depth value based on brightness information of the object of the other frames.

12. The display method of claim 7, further comprising detecting motion information of an object in the frames grouped into the at least one group,
wherein the generating of the 3D image generates the 3D image corresponding to the other frames excluding the key frames based on the detected motion information and the depth value allocated to the key frames.

13. At least one non-transitory computer readable medium storing computer readable instructions that control at least one processor to implement the method of claim 7.

* * * * *